(12) United States Patent
Hong

(10) Patent No.: US 9,338,354 B2
(45) Date of Patent: May 10, 2016

(54) MOTION BLUR ESTIMATION AND RESTORATION USING LIGHT TRAILS

(75) Inventor: Li Hong, San Diego, CA (US)

(73) Assignee: Nikon Corporation (JP)

( * ) Notice: Subject to any disclaimer, the term of this patent is extended or adjusted under 35 U.S.C. 154(b) by 0 days.

(21) Appl. No.: 14/122,421

(22) PCT Filed: Sep. 11, 2012

(86) PCT No.: PCT/US2012/054599
§ 371 (c)(1),
(2), (4) Date: Nov. 26, 2013

(87) PCT Pub. No.: WO2013/052241
PCT Pub. Date: Apr. 11, 2013

(65) Prior Publication Data
US 2014/0078321 A1 Mar. 20, 2014

Related U.S. Application Data

(60) Provisional application No. 61/542,580, filed on Oct. 3, 2011.

(51) Int. Cl.
G06T 5/00 (2006.01)
G06T 5/20 (2006.01)
H04N 5/232 (2006.01)

(52) U.S. Cl.
CPC ............ *H04N 5/23254* (2013.01); *G06T 5/003* (2013.01); *G06T 5/20* (2013.01); *H04N 5/23248* (2013.01); *G06T 2207/20101* (2013.01); *G06T 2207/20201* (2013.01)

(58) Field of Classification Search
CPC .......... H04N 5/23264; H04N 5/23254; H04N 5/23258; G06T 5/003; G06T 2207/20201; G06T 2207/20101
See application file for complete search history.

(56) References Cited

U.S. PATENT DOCUMENTS 5,148,209 A 9/1992 Subbarao
6,347,153 B1 2/2002 Triplett et al.
(Continued)

FOREIGN PATENT DOCUMENTS

CN 101359398 B 2/2009
CN 101504765 A 8/2009
(Continued)

OTHER PUBLICATIONS

Microsoft, Image Deblurring using Inertial Measurement Sensors, SIGGRAPH 2010, http://www.research.microsoft.com/en-us/um/redmond/groups/ivm/imudeblurring/, Copyright Microsoft 2010.
(Continued)

*Primary Examiner* — Shahbaz Nazrul
(74) *Attorney, Agent, or Firm* — Roeder & Broder LLP; Steven G. Roeder

(57) ABSTRACT

A method for processing a blurred image (16) that includes a captured light trail (24) includes the steps of: (i) displaying the blurred image (16) on an image display (36); (ii) manually identifying an image patch (25) that includes the captured light trail (24) in the displayed blurred image (16); (iii) calculating a point spread function for the captured light trail (24) with a control system (28); and (iv) deblurring at least a portion of the blurred image (16) with the control system (28) utilizing the calculated point spread function.

15 Claims, 3 Drawing Sheets

(56) References Cited

U.S. PATENT DOCUMENTS

| | | | |
|---|---|---|---|
| 6,470,097 | B1 | 10/2002 | Lai et al. |
| 7,536,090 | B2 | 5/2009 | Fukumoto et al. |
| 7,616,826 | B2 | 11/2009 | Freeman et al. |
| 7,639,888 | B2 | 12/2009 | Steinberg et al. |
| 8,064,720 | B2 | 11/2011 | Ozluturk |
| 8,472,744 | B2 | 6/2013 | Hong |
| 2001/0016054 | A1 | 8/2001 | Banker et al. |
| 2004/0218914 | A1 | 11/2004 | Sato |
| 2006/0098891 | A1* | 5/2006 | Steinberg et al. ............ 382/255 |
| 2008/0025627 | A1 | 1/2008 | Freeman et al. |
| 2008/0253676 | A1 | 10/2008 | Oh et al. |
| 2009/0060373 | A1* | 3/2009 | Perera et al. .................. 382/264 |
| 2009/0128641 | A1 | 5/2009 | Ozluturk |
| 2009/0196524 | A1 | 8/2009 | Godin |
| 2009/0225174 | A1 | 9/2009 | Handa et al. |
| 2010/0066842 | A1 | 3/2010 | Narasimha et al. |
| 2010/0183241 | A1 | 7/2010 | Lin et al. |
| 2010/0231732 | A1 | 9/2010 | Baxansky et al. |
| 2010/0246952 | A1 | 9/2010 | Banner et al. |
| 2010/0265353 | A1* | 10/2010 | Koyama et al. ............ 348/222.1 |
| 2010/0272356 | A1 | 10/2010 | Hong |
| 2011/0096180 | A1 | 4/2011 | McCloskey et al. |
| 2013/0058588 | A1* | 3/2013 | Wang et al. ................. 382/255 |
| 2013/0169824 | A1 | 7/2013 | Hong et al. |
| 2013/0170765 | A1* | 7/2013 | Santos et al. ................. 382/255 |

FOREIGN PATENT DOCUMENTS

| | | |
|---|---|---|
| CN | 101552872 A | 10/2009 |
| GB | 2468380 A | 7/2010 |
| JP | 2000298300 A | 10/2000 |
| KR | 20100034145 A | 4/2010 |
| WO | WO2009146297 A1 | 12/2009 |
| WO | WO2012060835 A1 | 5/2012 |
| WO | WO2013052241 A1 | 4/2013 |

OTHER PUBLICATIONS

Unshake Index, 1.5 (Small Wriggly Thing), http://www.zen147963.zen.co.uk/Unshake/, © M.D. Cahill 2000-2006.

Topaz Labs, Topaz Infocus, The Simple Sharpening and Deblurring Solution, http://www.topazlabs.com/, © 2010 Topaz Labs.

Blurity, Blurity-main site, blogging about blur and motion blur, http://www.blurity.com/, © 2012 Blurity Blog.

Picturesolve, Image DeBlurring and Restoration Service; Blind Deconvolution or Deblur of Focus or Motion Blur, http://www.picturesolve.com/, web site last updated Oct. 19, 2010.

Fergus et al. Removing Camera Shake from a Single Photograph.: Dec. 2006. http://seit.unsw.adfa.edu.au/coursework/ZEIT4226/Removing%20camera%20shake%20p787-fergus.pdf.

The International Search Report and Written Opinion for PCT/US2012/054599, Nov. 23, 2012, Nikon Corporation (related to the present application).

The International Preliminary Report on Patentability for PCT/US2010/055325, May 26, 2013, Nikon Corporation.

The International Search Report and Written Opinion for PCT/US2010/055325, Dec. 30, 2010, Nikon Corporation.

The International Preliminary Report on Patentability for PCT/US2009/045128, Dec. 27, 2010, Nikon Corporation.

The International Search Report and Written Opinion for PCT/US2009/045128, Oct. 26, 2009, Nikon Corporation.

Focus Magic, http://www.focusmagic.com, @ 2012 Acclaim Software Ltd.

The International Preliminary Report on Patentability for PCT/US2012/054599, Apr. 8, 2014, Nikon Corporation (related to the present application).

Zhe Hu, Sunghyun Cho, Jue Wang and Ming-Hsuan Yang, Deblurring Low-light Images with Light Streaks, IEEE conference on Computer Vision and Pattern Recognition (CVPR 2014). Columbus, Ohio, US, 2014.

Binh-Son Hua and Kok-Lim Low, Interactive Motion Deblurring Using Light Streaks, IEEE ICIP, Sep. 11, 2011. Department of Computer Science, National University of Singapore.

* cited by examiner

MOTION BLUR ESTIMATION AND RESTORATION USING LIGHT TRAILS

BACKGROUND

Cameras are commonly used to capture an image of a scene that includes one or more objects. Unfortunately, some of the images are blurred. For example, movement of the camera and/or movement of the objects in the scene during the exposure time of the camera can cause the image to be blurred. Further, if the camera is not properly focused when the image is captured, that image will be blurred.

SUMMARY

The present invention is directed to a method for processing, e.g. deblurring and restoring a blurred image that includes a light trail. In one embodiment, the method includes the steps of (i) displaying the blurred image on an image display; (ii) manually identifying an image patch in the displayed blurred image; and (iii) calculating a point spread function for at least a portion of the image patch with a control system. In certain embodiments, the manually identified image patch includes a captured light trail. Further, the step of calculating a point spread function includes calculating the point spread function for the captured light trail. With this design, in certain embodiments, the present invention is directed to a semi-automatic method to address motion blur estimation and restoration for general image types (night scene and others).

In one embodiment, the step of calculating a point spread function includes the steps of (i) identifying pixels in the image patch that have captured part of the captured light trail as light trail pixels, and (ii) identifying pixels in the image patch that have not captured part of the captured light trail as background pixels. Further, the point spread function can be calculated for the identified light trail pixels.

As provided herein, in certain embodiments, a portion or the entire blurred image can be deblurred and restored utilizing the calculated point spread function. Further, in certain embodiments, the point spread function can be calculated utilizing a blind or non-blind deconvolution method.

In yet another embodiment, the method includes the steps of: displaying the blurred image on an image display; manually identifying an image patch that includes the captured light trail in the displayed blurred image; calculating a point spread function for the captured light trail with a control system; and deblurring at least a portion of the blurred image with the control system utilizing the calculated point spread function.

The present invention is also directed to a computer including an image display that displays the image, an identifier that can be used to manually identify the light trail, and a control system that utilizes the method disclosed herein to restore the image.

In still another embodiment, the present invention is directed to a camera including (i) a capturing system for capturing the captured image of the scene; (ii) an image display for displaying the captured image of the scene; (iii) an identifier for manually identifying an image patch in the displayed captured image in the event the displayed captured image includes a light trail; and (iv) a control system that calculates a point spread function for at least a portion of the image patch.

Further, the control system can (i) identify light trail pixels in the image patch that have captured part of the captured light trail, (ii) identify background pixels in the image patch that have not captured part of the captured light trail, and (iii) calculate the point spread function for the identified light trail pixels. Moreover, the control system can deblur at least a portion of the blurred image utilizing the calculated point spread function.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
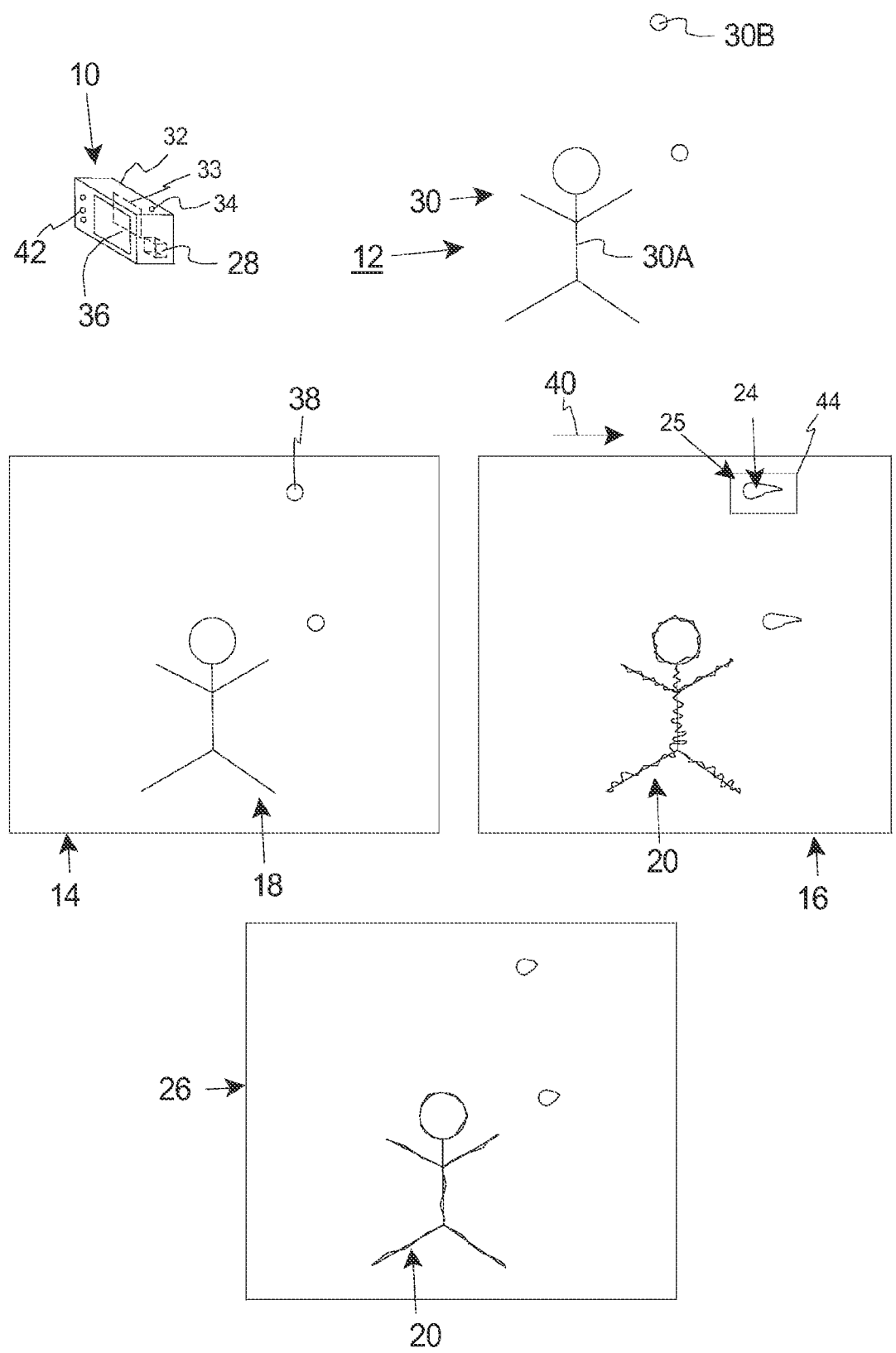
FIG. 1 is a simplified view of a scene, an image apparatus having features of the present invention, a raw, first captured image of the scene, a raw, second captured image of the scene, and an adjusted image.

FIG. 1 is a simplified perspective view of an image apparatus 10 (e.g. a digital camera) having features of the present invention, and a scene 12. FIG. 1 also illustrates a raw first captured image 14 (illustrated away from the image apparatus 10), and a raw second captured image 16 (illustrated away from the image apparatus 10), each captured by the image apparatus 10. In FIG. 1, the first captured image 14 is intended to illustrate a sharp image 18 (with sharp edges and straight lines) and the second captured image 16 is intended to illustrate a blurred image 20 (with weak edges and wavy lines). For example, movement of the image apparatus 10 during the capturing of the blurred image 16 can cause motion blur 20 in the image 14.

As an overview, in one embodiment, the present invention is directed to a semi-automatic method to address motion blur estimation and restoration for general image types (night scene and others). For example, the present method can be used for general image types with the presence of motion light trails 24. However, the present invention relies on the user to identify an image patch 25 (sometimes referred to as a "selected area") that contains one or more motion blur light trails 24. Subsequently, in certain embodiments, the blurred image 16 can be automatically post-processed to reduce the amount of image blur 20 to create an adjusted image 26.

In one embodiment, the image apparatus 10 includes a built in control system 28 (illustrated in phantom) that uses the unique method disclosed herein for identifying the light trail 24, and restoring the blurred image 16 to create the adjusted image 26 with a reduced level of blur 20.

Figure 2:
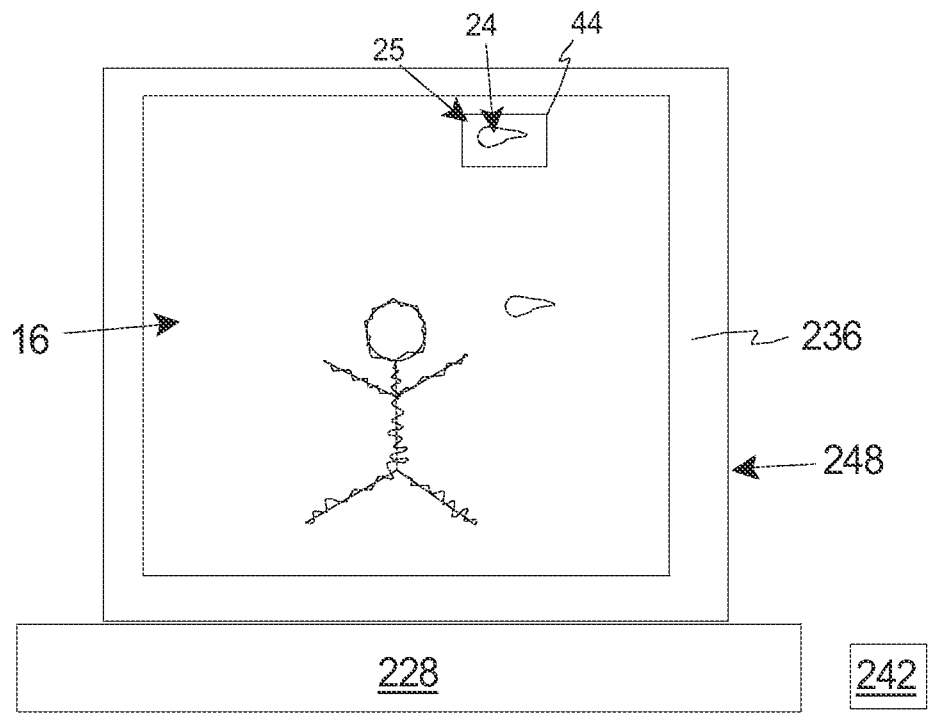
FIG. 2 is a simplified illustration of a computer system having features of the present invention.

Alternatively, referring to FIG. 2, the blurred image 16 can be transferred to a computer 248 having a control system 228 that uses the unique method for identifying and restoring the image 16 that includes a light trail 24 to create the adjusted image 26 (illustrated in FIG. 1). Still alternatively, the blurred image 16 can be transferred to a website (not shown) having a control system that uses the unique method for identifying and restoring the image 16 that includes a light trail 24 to create the adjusted image 26.

With the present invention, in certain embodiments, the user manually identifies one or more of the light trails 24 in the blurred image 16. Next, the control system 28, 228 determines a point spread function for the identified light trail 24. Subsequently, the control system 28, 228 deblurs and restores the blurred image 16 using the determined point spread function. Because, with the present invention, the light trail 24 is manually identified by the user, less computational power is required as opposed to an automatic identification of the light trail 24 with the control system 28, 228. This can allow for in camera correction of a blurred image 16.

Further, because the shape, direction, and other characteristics of light trails 24 are very random, the number of incorrectly identified (false positives) light trails 24 is reduced utilizing manual identification of the light trail 24. In contrast, in order to reduce the number of false positives in a completely automated method, various constraints can be imposed on the automatic identification of the light trails. However, these constraints can degrade the ability to detect motion blur images. Stated in another fashion, it is extremely challenging for an automatic algorithm to correctly identify motion related light trails for general images without introducing certain amount of false positives.

Referring back to FIG. 1, the type of scene 12 captured by the image apparatus 10 can vary. For example, the scene 12 can include one or more objects 30, e.g. animals, plants, mammals, light sources, and/or environments. For simplicity, in FIG. 1, the scene 12 is a night scene that is illustrated as including a simplified stick figure of a person 30A, and two spaced apart light sources 30B (each illustrated as a circle). In contrast, the scene may not include a person or any light sources, or the blurred image 16 with the light trail 24 may not be a night scene. Further, as non-exclusive examples, the light source 30B in the scene 12 can be the result of a light producing element, a reflection, or another type light producing event.

In FIG. 1, the image apparatus 10 is a digital camera, and includes an apparatus frame 32, an optical assembly (not shown), and a capturing system 33 (illustrated as a box in phantom), in addition to the control system 28. The design of these components can be varied to suit the design requirements and type of image apparatus 10. Further, the image apparatus 10 could be designed without one or more of these components. Additionally or alternatively, the image apparatus 10 can be designed to capture a video of the scene 12.

The apparatus frame 32 can be rigid and support at least some of the other components of the image apparatus 10. In one embodiment, the apparatus frame 32 includes a generally rectangular shaped hollow body that forms a cavity that receives and retains at least some of the other components of the camera. The apparatus frame 32 can include a shutter button 34 that causes the capturing system 33 to capture the image 14, 16.

The optical assembly can include a single lens or a combination of lenses that work in conjunction with each other to focus light onto the capturing system 33. In one embodiment, the image apparatus 10 includes an autofocus assembly (not shown) including one or more lens movers that move one or more lenses of the optical assembly in or out until the sharpest possible image of the subject is received by the capturing system 33.

The capturing system 33 captures information for the images 14, 16. The design of the capturing system 33 can vary according to the type of image apparatus 10. For a digital-type camera, the capturing system 33 includes an image sensor (not shown) e.g. charge coupled device, a filter assembly (not shown) e.g. a Bayer filter, and a storage system (not shown). The storage system can be fixedly or removable coupled to the apparatus frame 32. Non-exclusive examples of suitable storage systems include flash memory, a floppy disk, a hard disk, or a writeable CD or DVD.

The control system 28 is electrically connected to and controls the operation of the electrical components of the image apparatus 10. The control system 28 can include one or more processors and circuits, and the control system 28 can be programmed to perform one or more of the functions described herein. Further, in this embodiment, the control system 28 is positioned within the apparatus frame 32 for in camera processing of the images 14, 16. Alternatively, a control system that utilizes the algorithm disclosed herein can be separate from the camera (e.g. a computer or a website) that performs post-processing on the images 14, 16.

The image apparatus 10 can include a camera image display 36 that displays control information, control switches, and/or other information that can be used to control the various functions of the image apparatus 10. Further, the camera image display 36 can display low resolution thru images captured by the image apparatus 10.

Additionally, the camera image display 36 can display the raw captured images 14, 16 and/or the adjusted image 26. With this design, a user can decide which images 14, 16 are sharp and do not need further processing, and/or which images 14, 16 are blurred and need post-processing. For example, upon review of the first captured image 14, the user can determine that this image is sharp 18 and that no additional processing is necessary. Alternatively, upon review of the second captured image 16, the user can determine that this image is blurred 20 and requires further processing.

When a point of light 30B from a scene 12 is captured while the camera 10 is held steady, the captured point of light 38 appears as a disk shaped light (illustrated as a circle in FIG. 1) when in focus in the sharp image 18. Alternatively, when the point of light 30B from the scene 12 is captured while the camera is being moved (e.g. shaked), the resulting image 16 can include a light trail 24 around the location of the light source 30B, where the light trail 24 reflects and corresponds to the motion of the camera 10 during the capturing of the image 16. In this example, the light trail 24 has a trace direction 40 (illustrated with an arrow) that reflects and corresponds to the motion of the camera 10 during capturing of the image. For example, the second captured image 16 was captured while moving the camera 10 sideways (horizontally). As a result thereof the light trails 24 in the second captured image 16 extend generally horizontally. Usually, the camera 10 shake is not as simple as the horizontal or linear direction 40 like the example illustrated in FIG. 1. Typically, however, the camera 10 shake is random. As a result thereof, the light trail 24 is random shaped.

It should be noted that, for example, the light trails 24 can be caused by camera motion while capturing light in the scene. Alternatively, the light trails 24 can be caused by saturated light, near saturated light, high lights, reflections, or other sources inside the scene. As provided herein, one or more of the light trails 24 may not associate exactly to a real point source. For example, a night city scene may contain window lights from skyscrapers. With this type of scene, if the camera 10 is shaken while the image is captured, this will result in light trails related to these window lights.

As provided herein, in certain embodiments, with the present invention, the user can decide that the image 14 is sharp and does not include any light trails 24. In this case, no other processing of the image 14 is necessary. Alternatively, the user can identify the image 16 as being blurred, and subsequently identify one or more of the light trails 24 in the image 16. Next, the control system 28, 228 can reduce the amount of blur 20 in the second image 16 to provide the adjusted image 26.

In one embodiment, the image apparatus 10 can include an identifier 42 that can be used by the user (e.g. person operating the camera) to manually identify an image patch 25 containing one or more of the light trails 24. For example, the identifier 42 can include one or more control switches (e.g. buttons or dials) that are electrically connected to the control system 28. Alternatively, as another non-exclusive example, the camera image display 36 can be a touch screen that functions as the identifier 42. In any event, the identifier 42 can be any type of controller that is operated by the user that allows for the manual identification of the image patch 25.

Similarly, referring to FIG. 2, the computer 248 can include a computer image display 236 that displays the raw images 14, 16. With this design, the user can decide which images 14, 16 are sharp and do not need further processing, and/or which images 14, 16 are blurred and need post-processing.

Further, the computer 248 can include an identifier 242 that can be used by the user to manually identify an image patch 25 including one or more of the light trails 24. For example, the identifier 242 can be a mouse or a keyboard that is electrically connected to the control system 228 that allows the user to manually identify the image patch 25. Alternatively, as another non-exclusive example, the computer image display 236 can be a touch screen that functions as the identifier 242.

The type of manual identification of the image patch 25 containing the light trail 24 can vary. In one non-exclusive embodiment, the user can use the identifier 42, 242 to create an outline 44 that defines the boundary of the image patch 25 and encompasses (e.g. encircles) one or more light trails 24. As non-exclusive examples, the outline 44 can be a rectangular shaped box, a circle, an oval or another type of shape. Alternatively, as other non-exclusive examples, the user can identify points around one or more light trails 24, or trace around the perimeter of one light trail 24 to identify the image patch 25.

In example illustrated in FIGS. 1 and 2, the user has created a box 44 with the identifier 42, 242 that defines the image patch 25 that includes pixels that have captured a single light trail 24.

In certain embodiments, the present invention will work if two or more separate light trails 24 are included in the selected image patch 25. Still alternatively, in certain embodiments, the user can manually identify multiple image patches 25, with each image patch 25 having at least one light trail 24. In this embodiment, the control system 28, 228 can process one or more of the selected image patches 25. If multiple image patches 25 are processed, the information from the multiple image patches 25 can be combined in some fashion to determine the point spread function for the captured image.

As another non-exclusive example, the image patch 25 can be identified by cropping the image 16.

Figure 3:
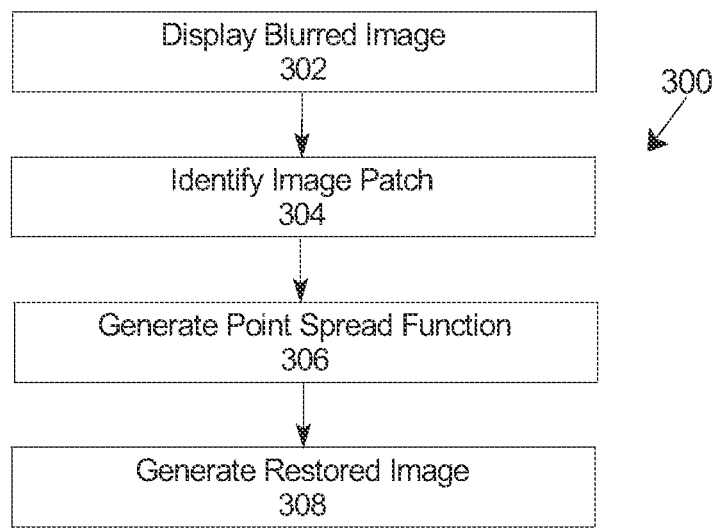
FIG. 3 is a flow chart that illustrates a method having features of the present invention.
Figure 4:
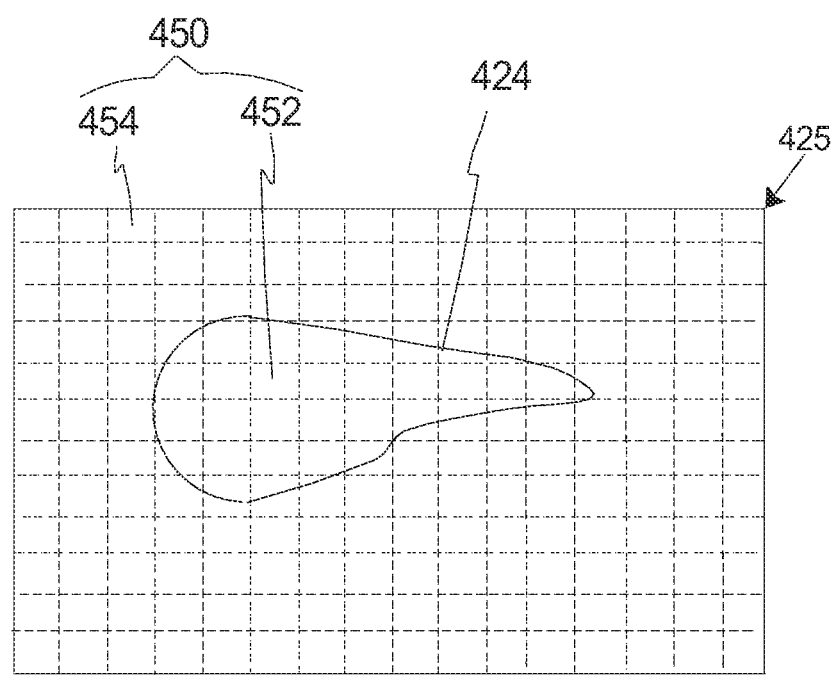
FIG. 4 is a simplified illustration of an image patch from the blurred image.

FIG. 3 is a flow chart that illustrates one embodiment of one non-exclusive method 300 having features of the present invention. First, at step 302, the blurred image is displayed on the image display. Subsequently, at step 304, the image patch including the light trail is manually identified by the user in the blurry image. FIG. 4 is a simplified illustration of an enlarged image patch 425 ("selected area") taken from the blurred image 16 (illustrated in FIG. 1) that was manually selected by the user. In this embodiment, the image patch 425 includes a single light trail 424. The image patch 425 is defined by a plurality of pixels 450 (illustrated as dashed boxes). The shape of the image patch 425 and the size of the image patch 425 (e.g. number of pixels 450 that make up the image patch 425) can be varied pursuant to the teachings provided herein. For example, in certain embodiments, the user selects the shape and size of the image patch 425 via control of the identifier 42. Alternatively, the control system 28 can limit the size and shape options that are available for selection by the user.

In one non-exclusive example, the image patch 425 includes between approximately twenty (20) and one hundred (100) pixels. However, it should be noted that the number of pixels in the image patch 425 can be varied by a number of factors including the size of the light trail 424 and the resolution of the original blurred image 16.

Referring back to FIG. 3, next, at step 306, the control system analyzes at least a portion of the image patch and generates a point spread function for at least a portion of the image patch. In one non-exclusive embodiment, the control system can analyze the image patch and determine which pixels have captured a portion of the light trail. Subsequently, the point spread function can be calculated utilizing the pixels that make up the light trail.

More specifically, referring to FIG. 4, as provided herein, the pixels 450 in the image patch 425 can be categorized as either light trail pixels 452 or background pixels 454. Light trail pixels 452 are the pixels in the image patch 425 that have captured part of the captured light trail 424. In contrast, background pixels 454 are the pixels in the image patch 425 that have not captured part of the captured light trail 424.

In this embodiment, the control system 28 (illustrated in FIG. 1) can analyze the image patch 425 to (i) identify and label pixels 450 in the image patch 425 that have captured part of the captured light trail 424 as light trail pixels 452, and (ii) identify and label pixels 450 in the image patch 425 that have not captured part of the captured light trail 424 as background pixels 454. Next, the control system 28 can create a background mask that masks out the background pixels 454.

As one non-exclusive example, a simple segmentation algorithm can be used to identify and separate the light trail pixels 452 from the background pixels 454 in the image patch 425. Many different segmentation techniques can be utilized. In one embodiment, the maximum color value for the color channels is identified, and subsequently, the maximum color value is compared to some thresholds for identifying the light trail pixels 452. As one non-exclusive example, the segmentation technique can utilize two levels of thresholds, with the first level ("low threshold") being relatively low, and the second level ("high threshold") being close to saturation point. As a non-exclusive example, the low threshold can be approximately 192 and the high threshold can be approximately 240. However, other values can be used for the thresholds.

In this embodiment, the light trail pixels 452 will have a maximum color value higher than the low threshold. In addition, the identified light trail regions will also contain a certain percentage of pixels with a color value that is greater than the high threshold. As a non-exclusive example, the certain percentage can be ten percent or greater.

The remaining pixels in the image patch 425 that do not meet this criteria are classified as background pixels 454. With this procedure, the light trail pixels 452 and the background pixels 454 can be identified.

Subsequently, in certain embodiments, the point spread function can be calculated for the light trail 424 using the identified light trail pixels 452.

It should be noted that in certain embodiments, the control system 28, 228 can evaluate neighboring pixels that are nearby and outside the selected image patch 425 to insure that the entire light trail 424 is used to calculate the point spread function even if the user incorrectly created an image patch 425 that did not include the entire light trail 424. With this design, in certain designs, certain neighboring pixels can also be classified as light trail pixels 452.

Many alternative methods can be utilized to identify the point spread function ("PSF") kernel for the light trail pixels 452. For example, a simple method (e.g. a mapping method) can be utilized to estimate the PSF kernel, or a more complicated PSF estimation algorithm can be utilized. Still alternatively, the simple PSF method can be utilized to generate a simple PSF kernel that is then refined with the more complicated PSF estimation algorithm. As provided herein, many existing PSF estimation algorithms do not handle saturated pixels very well.

In one embodiment, the PSF estimated by the simple PSF estimation method can be used as an initialization PSF for a more sophisticated PSF estimation algorithm. In this example, the more sophisticated PSF estimation algorithm can utilize image regions that do not contain saturated lights.

In one embodiment, the image patch 425 can be converted to a grayscale patch (G). Subsequently, the background pixels 452 in the grayscale patch G can be set to zero to create the background mask. Next, a function f is applied to map G to generate the initial PSF (im_psf). In one embodiment, the function f emphasizes pixels with a high intensity (e.g. im_psf=1000^(G./255)). Subsequently, the background pixels 452 in the initial PSF (im_psf) are set to be zero. Next, the initial PSF (im_psf) is normalized (sum (im_psf)=1). More specifically, the PSF function can be normalized to have the sum of all of the pixels equal to one (essentially, compute the sum of all pixels first, and then divide each pixel by this sum, so the sum of all updated pixel values will be one). In summary, in one embodiment, the binary mask of the image patch 425 is converted to gray scale intensity, with more weight assigned to higher intensity values. Next, the PSF function is applied, and the region is normalized.

With the present invention, in certain embodiments, the light trail patch 425 is evaluated to estimate an initial PSF kernel. As non-exclusive examples, a refined PSF kernel can be generated by supplying the initial PSF kernel to another PSF estimation algorithm (e.g., a matlab blind deconvolution, the PSF estimation algorithm described in (i) U.S. patent application Ser. No. 12/740,664 filed on Apr. 29, 2010, (ii) U.S. Provisional Application No. 61/617,358 filed on Mar. 29, 2012, (iii) U.S. Provisional Application No. 61/617,539 filed on Mar. 29, 2012, or (iv) U.S. Provisional Application No. 61/640,492 filed on Apr. 30, 2012, or another type of PSF estimation algorithm). As far as permitted, the contents of U.S. patent application Ser. No. 12/740,664, U.S. Provisional Application No. 61/617,358, U.S. Provisional Application No. 61/617,539, and U.S. Provisional Application No. 61/640,492 are incorporated herein by reference.

Referring back to FIG. 3, next, at step 308, the control system utilizes the generated point spread function to deblur a portion or the entire blurry image to generate the restored, adjusted image. Stated in another fashion, a sharp version of the blurred image can be reconstructed based on either the initial PSF kernel (simple and fast computation) or a refined PSF kernel (more computation to reach higher quality).

In summary, in certain embodiments, with the present invention, the user only needs to identify an image patch 425 containing the light trail 424. After that, the control system 28 restores the blurred image 16. With this design, the user does not have to identify the motion blur size and/or the motion blur direction. Further, with this design, the motion kernel is not constrained to be linear motion (e.g. the method can be used for non-linear motion blur). As a result thereof, the present invention provides a simple and fast semi-automatic method to address a very challenging motion estimation problem by utilizing user identified blurry light trail patch 425 with a simple PSF estimation method.

Stated in another fashion, the present invention is a semi-automatic method that allows user to indicate an image patch 425 that is subsequently analyzed by the control system 28 to determine the point spread function of the image patch 425 or a portion thereof. Next, the calculated point spread function can be applied to a portion of the image to restore that portion of the image or the calculated point spread function can be applied to the entire image to deblur the entire image.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A method for processing a blurred image, the method comprising the steps of:
    displaying the blurred image on an image display;
    manually identifying an image patch in the displayed blurred image, the image patch having a captured light trail; and
    calculating a point spread function for at least the captured light trail of the image patch with a control system, including identifying light trail pixels in the image patch that have captured part of the captured light trail and identifying background pixels in the image patch that have not captured part of the captured light trail using a segmentation algorithm.

2. The method of claim 1 wherein the step of calculating a point spread function includes calculating the point spread function for the identified light trail pixels.

3. The method of claim 1 further comprising a step of deblurring at least a portion of the blurred image with the control system utilizing the calculated point spread function.

4. The method of claim 1 further comprising a step of deblurring the blurred image with the control system utilizing the calculated point spread function.

5. The method of claim 1 wherein the step of calculating a point spread function includes utilizing a deconvolution method.

6. A computer including an image display that displays the blurred image, an identifier that can be used to manually identify the image patch, and a control system that utilizes the method of claim 1 to process the blurred image.

7. A camera including an image display that displays the blurred image, an identifier that can be used to manually identify the image patch, and a control system that utilizes the method of claim 1 to process the blurred image.

8. A method for processing a blurred image that includes a captured light trail, the method comprising the steps of:
    displaying the blurred image on an image display;
    manually identifying an image patch that includes the captured light trail in the displayed blurred image;
    calculating a point spread function for the captured light trail with a control system using a segmentation algorithm, including (i) identifying light trail pixels in the image patch that have captured part of the captured light trail, and (ii) identifying background pixels in the image patch that have not captured part of the captured light trail; and
    deblurring at least a portion of the blurred image with the control system utilizing the calculated point spread function.

9. The method of claim 8 wherein the step of calculating a point spread function includes calculating the point spread function for the identified light trail pixels.

10. The method of claim 8 wherein the step of deblurring includes deblurring the entire blurred image with the control system utilizing the calculated point spread function.

11. The method of claim 8 wherein the step of calculating a point spread function includes utilizing a deconvolution method.

12. A computer including an image display that displays the image, an identifier that can be used to manually identify the image patch, and a control system that utilizes the method of claim 8 to process the blurred image.

13. A camera including an image display that displays the image, an identifier that can be used to manually identify the image patch, and a control system that utilizes the method of claim 8 to process the blurred image.

14. A camera for capturing a captured image of a scene, the camera comprising:

a capturing system for capturing the captured image of the scene;

an image display for displaying the captured image of the scene;

an identifier for manually identifying an image patch including a light trail in the displayed captured image in the event the displayed captured image includes a light trail; and a control system that calculates a point spread function for at least the light trail of the image patch, wherein using a segmentation algorithm the control system (i) identifies light trail pixels in the image patch that have captured part of the captured light trail, (ii) identifies background pixels in the image patch that have not captured part of the captured light trail, and (iii) calculates the point spread function for the identified light trail pixels.

15. The camera of camera 14 wherein the control system deblurs at least a portion of the image utilizing the calculated point spread function.

* * * * *